US007039023B2

(12) United States Patent
Aoki

(10) Patent No.: US 7,039,023 B2
(45) Date of Patent: May 2, 2006

(54) TRANSMISSION POWER CONTROL METHOD AND APPARATUS AND COMPUTER-RECORDABLE RECORDING MEDIUM

(75) Inventor: Hiroshi Aoki, Kanagawa (JP)

(73) Assignee: NEC Corporation, Tokyo (JP)

( * ) Notice: Subject to any disclaimer, the term of this patent is extended or adjusted under 35 U.S.C. 154(b) by 871 days.

(21) Appl. No.: 09/993,642

(22) Filed: Nov. 27, 2001

(65) Prior Publication Data

US 2002/0067708 A1    Jun. 6, 2002

(30) Foreign Application Priority Data

Dec. 5, 2000  (JP) .............................. 2000-370027

(51) Int. Cl.
*H08C 17/00*  (2006.01)

(52) U.S. Cl. ...................... 370/311; 370/342; 370/479; 455/522

(58) Field of Classification Search ................ 370/335, 370/441, 479, 318, 320, 342, 311; 455/522; 379/395.01
See application file for complete search history.

(56) References Cited

U.S. PATENT DOCUMENTS

| 5,878,350 | A  | * | 3/1999 | Nakamura et al. | .......... 455/442 |
| 6,285,887 | B1 | * | 9/2001 | Mimura | ....................... 455/522 |
| 6,393,005 | B1 | * | 5/2002 | Mimura | ....................... 370/335 |
| 6,512,757 | B1 | * | 1/2003 | Niegel et al. | ................ 370/342 |
| 2002/0009061 | A1 | * | 1/2002 | Willenegger | ................. 370/328 |
| 2005/0208961 | A1 | * | 9/2005 | Willenegger | ................. 455/522 |

FOREIGN PATENT DOCUMENTS

| JP | 10-262028 | 9/1998 |
| JP | 10-262028 A | 9/1998 |
| JP | 11-266168 | 9/1999 |
| JP | 11-266168 A | 9/1999 |
| JP | 2002-501689 | 1/2002 |
| WO | WO 98/36606 A2 | 8/1998 |

* cited by examiner

*Primary Examiner*—Ricky Q. Ngo
*Assistant Examiner*—Nguyen H. Ngo
(74) *Attorney, Agent, or Firm*—Sughrue Mion, PLLC

(57) ABSTRACT

A transmission power control apparatus that has several transmission power control sections and a central processing section. The transmission power control sections are divided into a first transmission power control section and a group of second transmission power control sections. The central processing section selects the first transmission power control section and sets a basic code in response to generation of a call upon multi-code connection while setting subordinate codes for the second transmission power control sections. The first transmission power control section performs downstream transmission power control in accordance with the state of communication with a mobile unit and notifies the central processing section of a control result. The central processing section notifies all the second transmission power control section of the notified control result. The second transmission power control section performs downstream transmission power control on a self-channel on the basis of the notified control result.

4 Claims, 2 Drawing Sheets

TRANSMISSION POWER CONTROL METHOD AND APPARATUS AND COMPUTER-RECORDABLE RECORDING MEDIUM

BACKGROUND OF THE INVENTION

The present invention relates to a transmission power control method and apparatus suitably used for downstream transmission power control at the time of multi-code connection in a communication system based on the CDMA (Code Division Multiple Access) scheme and a computer-readable recording medium used for the method and apparatus.

In a conventional mobile communication system based on the CDMA scheme, downstream transmission power control based on the reception level of a mobile unit at the time of multi-code connection is performed separately for each code.

If downstream transmission power control is separately performed for each code or is not performed at all, interference increases in a downstream channel, resulting in a decrease in the capacity of a transmission path.

SUMMARY OF THE INVENTION

It is an object of the present invention to suppress an increase in interference in a downstream cannel during downstream transmission power control and preventing a decrease in the capacity of the overall system.

In order to achieve the above object, according to the present invention, there is provided a transmission power control apparatus comprising a plurality of transmission power control means respectively provided for channels, the plurality of transmission power control means including one first transmission power control means and a plurality of second transmission power control means, and central processing means for selecting the first transmission power control means from the plurality of transmission power control means and setting a basic code therefor in response to generation of a call upon multi-code connection while setting subordinate codes for the second transmission power control mean, wherein the first transmission power control means performs downstream transmission power control in accordance with a state of communication with a mobile unit and notifies the central processing means of a control result, the central processing means notifies all the second transmission power control means of the notified control result, and the second transmission power control means performs downstream transmission power control on a self-channel on the basis of the notified control result.

DESCRIPTION OF THE PREFERRED EMBODIMENT

The present invention will be described in detail below with reference to the accompanying drawings.

This embodiment is configured to prevent an increase in interference in a downstream channel by quickly and accurately performing downstream transmission power control for each code at the time of multi-code connection, thereby preventing a decrease in the capacity of the overall system.

Figure 1:
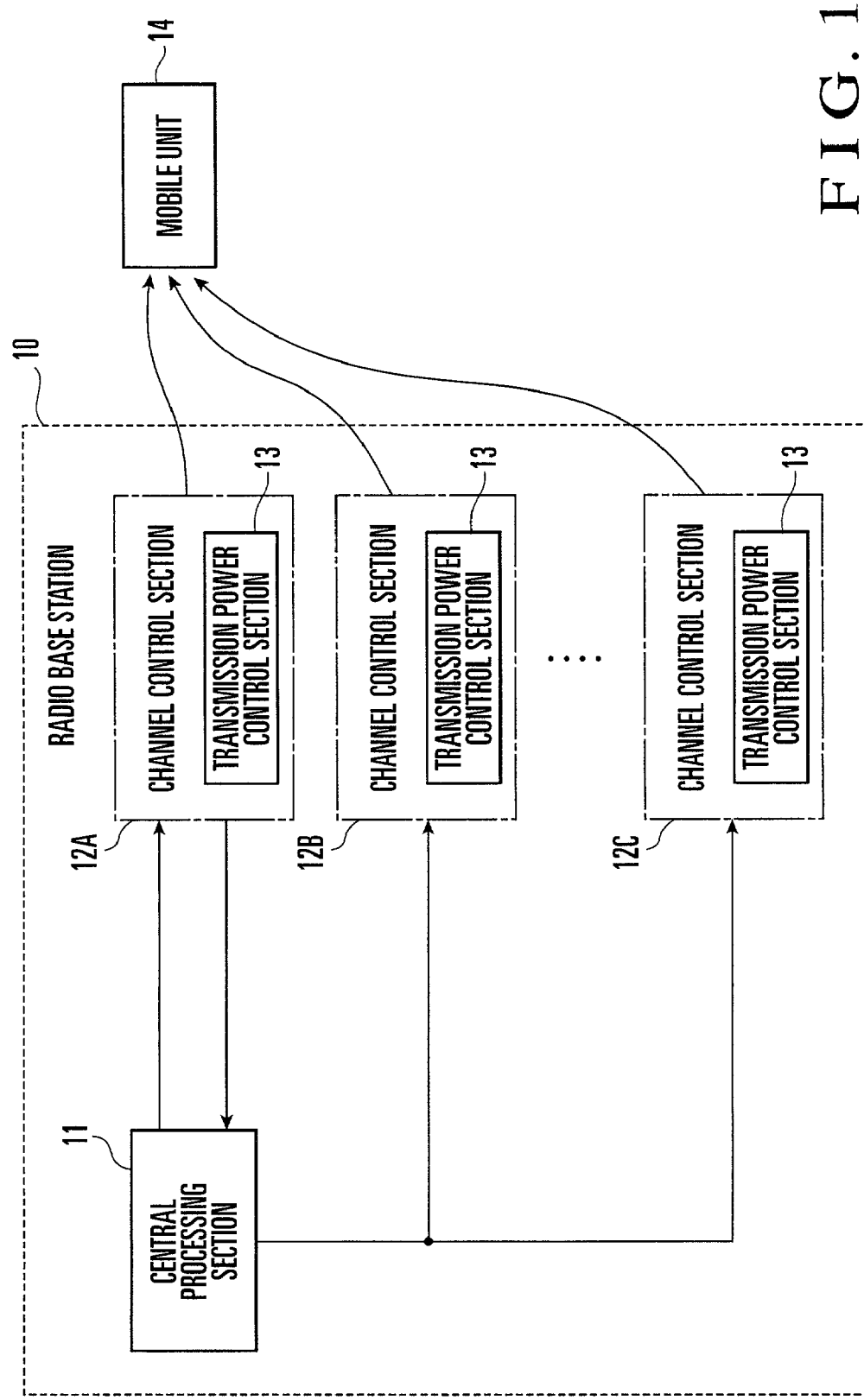
FIG. 1 is a block diagram showing a mobile communication system based on the CDMA scheme according to an embodiment of the present invention.

FIG. 1 shows a mobile communication system based on the CDMA scheme according to an embodiment of the present invention.

Referring to FIG. 1, a plurality of channel control sections 12A to 12C are installed in a radio base station 10. A central processing section 11 sets codes for the channel control sections 12A to 12C, respectively. Each of the channel control sections 12A to 12C includes a transmission power control section 13 for executing downstream transmission power control for a mobile unit 14 for each code. The central processing section 11 identifies a basic code at the time of occurrence of multi-code connection and a plurality of subordinate codes, and sets the respective codes for the channel control sections 12A to 12C.

The channel control section 12A, for which the basic code is set, notifies the central processing section 11 of the result of transmission power control periodically executed by the transmission power control section 13 every time transmission power control is executed. The central processing section 11 simultaneously notifies by broadcasting the remaining channel control sections 12B and 12C, for which the subordinate codes are set, of the control result received from the channel control section 12A. The transmission power control sections 13 of the channel control sections 12B and 12C, for which the subordinate codes are set, perform transmission power control on the basis of the notified control result.

Transmission power control operation will be described next with reference to the sequence chart of FIG. 2.

When a call is generated upon multi-code connection, the central processing section 11 selects the channel control section 12A, for which the basic code is set, and the channel control sections 12B and 12C, for which the subordinate codes are set, and sets corresponding codes for them, respectively (steps S101, S102, and S103).

The channel control section 12A, for which the basic code is set, always monitors the state of communication with the mobile unit 14, and performs downstream transmission power control in accordance with a change in the reception quality of the mobile unit 14 (step S105). The channel control section 12A notifies the central processing section 11 of this control result so as to quickly notify the channel control sections 12B and 12C, for which the subordinate codes are set, of the control result (step S106).

The central processing section 11 notifies by broadcasting the channel control sections 12B and 12C of the control result notified from the channel control section 12A (step S107). The transmission power control sections 13 of the channel control sections 12B and 12C perform downstream transmission power control on the basis of the control result received from the central processing section 11 (step S108). Note that in steps S104 and S109, control signals are transmitted from the channel control sections 12A, 12B, and 12C to the mobile unit 14 through downstream channels.

With this operation, at the time of multi-code connection, downstream transmission power control for all codes is synchronously performed with the same control value. As a consequence, minimum necessary, stable downstream transmission power can be supplied, and variations in quality during multi-code connection for the respective codes can be prevented. In addition, an increase in unnecessary power can be suppressed. This makes it possible to prevent a decrease in the capacity of the overall system.

A computer-readable recording medium storing a program for executing the above transmission power control will be described next.

Figure 2:
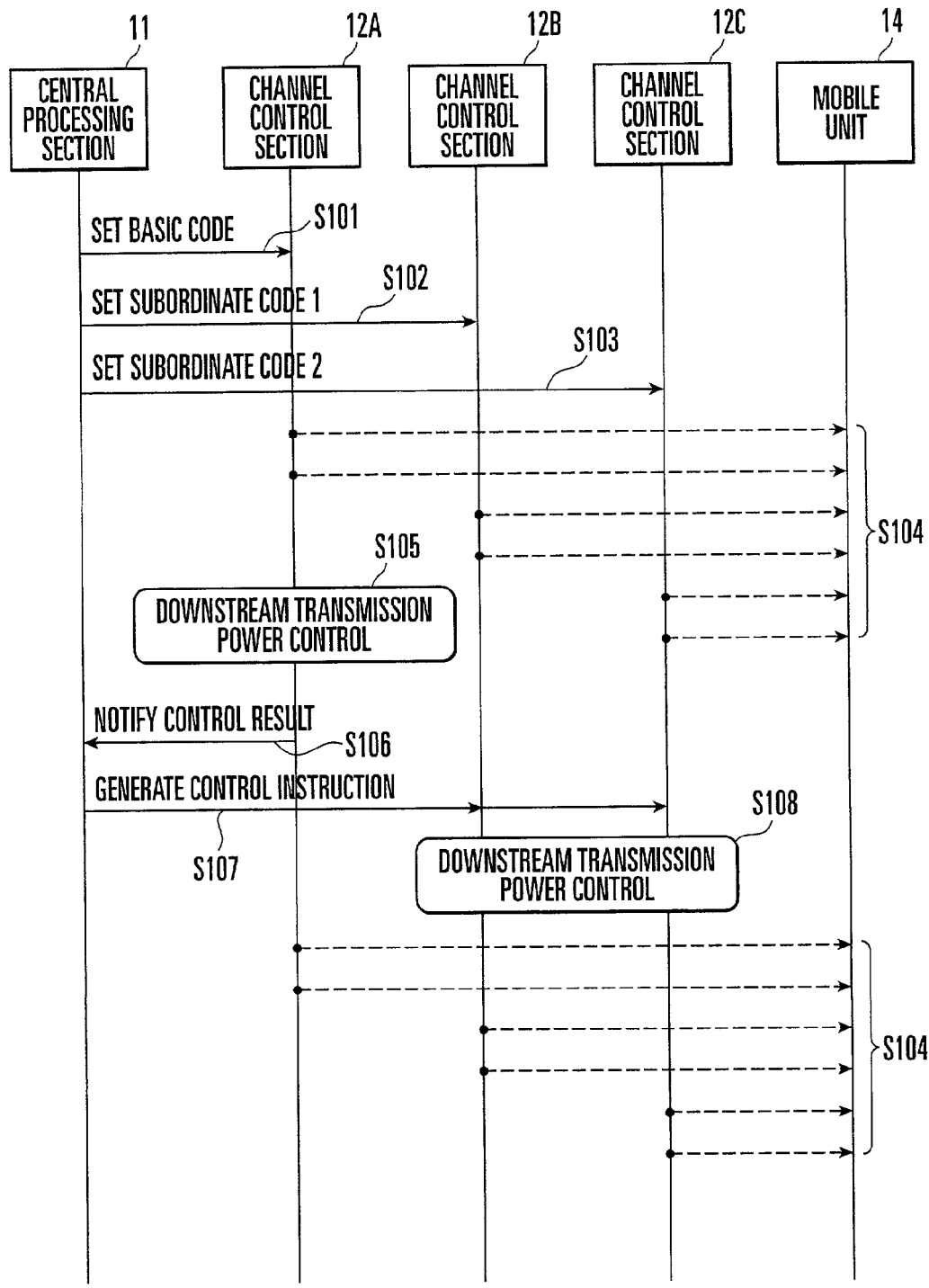
FIG. 2 is a sequence chart showing transmission power control operation in the mobile communication system in FIG. 1.

When the processing represented by the sequence chart of FIG. 2 is to be executed by a computer system, a recording medium storing a program executed by a CPU (Central Processing Unit) as a component of the central processing section 11 forms a computer-readable recording medium according to the present invention.

As this recording medium, a magnetooptical disk, optical disk, semiconductor memory, magnetic recording medium, or the like can be used. These media are used as a ROM (Read Only Memory), RAM (Random Access Memory), CD-ROM (Compact Disk ROM), flexible disk, memory card, and the like.

This recording medium also includes a medium desired to hold a program for a predetermined period of time, e.g., a volatile memory such as a RAM in a computer system serving as a server or client to which a program is transmitted through a network such as the Internet or a communication line such as a telephone line.

The above program may be transmitted from the computer system, which stores the program in a storage unit or the like, to another computer system through a transmission medium or over a carrier in a transmission medium. The above transmission medium is a medium having the function of transmitting information, e.g., a network (communication network) such as the Internet or a communication circuit (communication line) such as a telephone line.

The above program may be used to implement part of the above transmission power control section. In addition, alternatively, the program may be a so-called differential file (differential program) that can implement the above function in combination of a program that has already been recorded in the computer system.

Therefore, this recording medium can be used for a system or apparatus different from the system or apparatus in FIG. 1, and the computer of the system or apparatus can execute the program stored in this recording medium. In this case as well, functions and effects similar to those described above can be obtained, and the object of the present invention can be achieved.

According to the present invention, since downstream transmission powers at the time of multi-code connection are controlled to a common value and stabilized, the downstream transmission power can be accurately controlled in real time. This makes it possible to suppress an increase in unnecessary downstream transmission power and a decrease in the capacity of the overall system.

What is claimed is:

1. A transmission power control apparatus, comprising:
a plurality of transmission power control means respectively provided for channels, said plurality of transmission power control means comprising one first transmission power control means and a plurality of second transmission power control means; and
central processing means for selecting said first transmission power control means from said plurality of transmission power control means and setting a basic code therefor in response to generation of a call upon multi-code connection while setting subordinate codes for said second transmission power control means,
wherein said first transmission power control means performs downstream transmission power control in accordance with a state of communication with a mobile unit and notifies said central processing means of a control result,
said central processing means notifies all said second transmission power control means of the notified control result; and
said second transmission power control means performs downstream transmission power control on a self-channel on the basis of the notified control result,
wherein said transmission power control means and said central processing means are installed in a radio base station of a CDMA mobile communication system.

2. A transmission power control method, the method comprising:
selecting a first transmission power control section from a plurality of transmission power control sections respectively provided for channels and setting a basic code therefor in response to generation of a call upon multi-code connection while setting subordinate codes for remaining second transmission power control sections comprising the plurality of transmission power control sections;
performing downstream transmission power control in the first transmission power control section in accordance with a state of communication with a mobile unit;
causing the first transmission power control section to notify a central control section of a transmission power control result;
causing the central control section to notify all the second transmission power control sections of the notified control result; and
performing downstream power control on a self-channel in the second transmission power control section on the basis of the notified control result,
wherein the transmission power control means and the central processing means are installed in a radio base station of a CDMA mobile communication system.

3. A computer-readable recording medium on which a program is recorded, wherein the program causes a computer to perform a method, the method comprising:
selecting a first transmission power control section from a plurality of transmission power control sections respectively provided for channels and setting a basic code therefor in response to generation of a call upon multi-code connection while setting subordinate codes for remaining second transmission power control sections comprising the plurality of transmission power control sections;
performing downstream transmission power control in the first transmission power control section in accordance with a state of communication with a mobile unit;
causing the first transmission power control section to notify a central control section of a transmission power control result;
causing the central control section to notify all the second transmission power control sections of the notified control result; and
performing downstream power control on a self-channel in the second transmission power control section on the basis of the notified control result.

4. The computer-readable medium according to claim 3, wherein the transmission power control means and the central processing means are installed in a radio base station of a CDMA mobile communication system.

* * * * *